United States Patent Office 2,923,431
Patented Feb. 2, 1960

2,923,431
PROTECTIVE COATING

Franklin M. de Beers, Jr., Glenview, Ill., assignor to Enterprise Paint Manufacturing Company, Chicago, Ill., a corporation of Illinois No Drawing. Application July 16, 1957
Serial No. 672,110

8 Claims. (Cl. 220—64)

This invention relates to protective coatings, and more particularly to lacquers which are used in the can production industry to cover over solder seams inside cans, and/or to line the inside surface thereof, and to a novel method of forming such coatings.

Previous to the invention, various materials have been tried for this purpose, but have been rejected as unsatisfactory for one or more reasons. Thus, it has been known to use various fast curing alkyd resins or oreoresinous varnishes such as China-wood oil and BR254 phenolic resin heat reacted and then dissolved in a solvent, such as toluol, but the coatings formed therefrom tended to remain tacky and would only imperfectly cover the soldered seams. Then too such varnishes possess an undesirable flavor which they will impart to foodstuffs stored in the thus coated cans. Also, such coatings needed to be baked at relatively high temperature for sustained periods of time.

Therefore, a first and general object of the invention is to provide efficient, practical means and method of coating such soldered seams to effectively and completely cover the same.

Another object of the invention is to provide a thin, tough yet flexible, continuous film of material which will strongly adhere to the soldered seams, will not impart a flavor to foodstuff coming into contact therewith, and will provide effective resistance to chemical attack and breakdown.

Another object of the invention is to provide a composition which can be applied in thin coatings over the soldered seams, and will not require an extensive baking operation to provide the desired characteristics of effective protection and strong adherence to the same.

Various vinyl resins and their copolymers have also been dissolved in a fast solvent, such as a mixture of methyl ethyl ketone and toluol in an attempt to offer a solution to the problem. However, such coatings were also weak in coverage, and would not form a continuous film. Also such resins would not stick well to bare tinplate without a base or primer coat, particularly when used to line cans in which products containing water were packaged. Likewise, they could not be used where the contents stored in the coated cans needed to be sterilized at over 212° F., since the steam to which they were subjected in said sterilizing process would cause the film to loosen and reduce their resistance to chemical attack. Moreover, such coatings did not cure, and would readily dissolve or be softened by essential oils or other products having solvent action.

Although it is known that various thermosetting resins, such as the phenolics, urea-formaldehyde, alkyd and epoxy resins, can be combined therewith to partially overcome these limitations, the resultant coatings, even thus modified, are slow to cure, required baking at high temperatures, and were still unsatisfactory as far as coverage, adhesion to bare tinplate without a primer coat, and chemical resistance, and would still break down when subjected to the sterilizing process.

It has also been proposed to use mixtures of low molecular weight epoxy resin and fatty acid polyamides because of the excellent adhering property their reaction product has to a wide variety of different materials. However, when used as a side seam cover lacquer or for lining cans, they have several important limitations. Thus, it has been found that the mixtures thicken, and set so quickly from their liquid stage (in the matter of one to eight hours), that these advantages of good adherence are offset by the additional problems presented in handling and cleaning up the equipment. On the other hand, they do not reach a tack free state fast enough to be useful with high speed can making equipment. Generally speaking, although possessing good adherence to the bare tinplate, the flow characteristics and flexibility of the coatings were still far from satisfactory and difficulty was still met in attempts to produce a continuous film completely covering the sharp edges and points left by the soldering operation at the can seams.

Therefore, a further and major object of the invention is to provide a coating composition, and simplified process of using the same, to cover the soldered seams in a can and/or lining the interior thereof, which, in addition to being a material affording resistance to chemical attack and solvent action, will also strongly adhere to the bare tinplate without the need of a primer coat.

Still another object of the invention is to provide a protective coating of the aforesaid character which will not only readily and strongly adhere to bare tinplate, but will also be resistant to sterilizing temperatures above 212° F., and will not break down or lose its adherence character or chemical resistance when subjected to prolonged steam processing.

Another object of the invention is to provide a coating composition which, when applied as a thin film, will not only have the aforesaid high resistance to the steam sterilizing process, and good adherence to bare tinplate, but will also quickly cure and set to a tackfree continuous film over the sharp edges, points and like irregularities characteristic of a soldered connection or seam.

Still another object of the invention is to provide such a coating composition which will not only quickly cure at low temperatures to a tackfree state when applied as a thin coating onto a surface, but will resist gelling in the pot for relatively long periods of time, whereby fresh supplies need be supplied only at convenient periods and without the inconvenience and other disadvantages resulting from gelling in the equipment.

Surprisingly, it has been found that all of the objects of the invention can be reached, and the drawbacks of the previously tried materials and processes enumerated above, overcome by adding a vinyl resin copolymer to the mixture of certain fatty acid polyamides and certain epoxy resins.

Thus I have found that the following mixture when suitably diluted in a compatible solvent or solvents makes an excellent side seam lacquer:

Example A

| | Percent by weight |
|---|---|
| Hydroxyl containnig copolymer of vinyl chloride and vinyl acetate (Bakelite VAGH) | 30 |
| Fatty acid polyamid (Versamid 100) | 35 |
| Epoxy resin (Araldite 6040) | 35 |

Although the lacquer may be applied over the can seams in any one of the several conventional methods, it is usually diluted with solvent to approximately 15–30 sec. viscosity Ford #4 cup at 77° F. and sprayed over the side seam immediately after soldering and before the seam has had an opportunity to cool to room temperature. No baking beyond that transmitted from the seam in the process of its cooling is necessary. However, when the lacquer is sprayed onto the inside of the can to completely line its interior, it is preferable to follow the spraying operation with a bake of two to ten minutes at 250–400° F. which serves primarily to speed up the curing action. Therefore, even in this instance, the baking step may be omitted if it is more convenient to do so. Although, preferably, in lining cans, the coating material is applied by a spraying operation, the cans can be flush-lined or dipped. The coating can also be applied by a roller, and followed by the aforesaid 2–10 minute bake.

The viscosity of the coating lacquer can be controlled by suitable dilution of the ingredients in a compatible solvent or mixture of solvents. Examples of preferred solvents would include mixtures of ketones, such as isophorone, methyl isobutyl ketone, etc., ether-esters such as "Cellosolve" (mono ethyl ether of ethylene glycol) and its derivatives, alcohols higher than methyl, as for example, n-butanol; and aromatic diluents, such as toluol and xylol. For most coating purposes, a ratio of 20 to 35% resin and the balance solvent, on a weight basis has been found very satisfactory, although this ratio can be considerably varied in accordance with the method of application and thickness of coating desired. Such solvents are also useful in cleaning up the coating equipment employed.

One of the surprising characteristics of the resultant film is its rapid setting action immediately on contact with the surface to which it is applied as a thin layer or coating. This is due to the fact that its gelling action is so immediate that it sets before the coating material has an opportunity to flow away from the sharp edges and points characteristic of a soldered seam, and thus cures, under the heat of the seam, to form a tough flexible continuous film over the rough seam which unlike the prior art films, has no breaks or pinholes through which moisture or the like may gain entrance to destroy the adherence of the film.

Another surprise is the stabilizing action that the vinyl copolymer resin has on the epoxy-fatty acid polyamid mixture. For example, an unmodified mixture of equal parts by weight, on a solids basis, of the aforesaid Versamid 100 and Araldite 6040, both dissolved in suitable solvents to the required 15–20 sec. viscosity, will advance in the pot to a gel state in eight to twenty-four hours. However, by the addition of vinyl resin copolymer, as in Example A above, the mixture in suitable solvents and at the same viscosity will not reach the gel state at room temperatures for thirteen to twenty-one days. This is obviously a particularly useful characteristic in commercial applications of the lacquer, since it permits mixes to be conveniently prepared in advance of their need. Where the vinyl resin copolymer is increased so as to form a coating composition, embodying on a solids basis, by weight, as follows:

Example B

| | Percent by weight |
|---|---|
| Hydroxyl-containing copolymer of vinyl chloride and vinyl acetate (Bakelite VAGH) | 60 |
| Fatty acid polyamide (Veramid 100) | 20 |
| Epoxy resin (Araldite 6040) | 20 | and suitably dissolved in solvents to approximate the same viscosity, the lacquer will have a pot life of at least a year.

Still another surprise is the excellent adhesion and resistance to chemical and solvent action and the afore-described steam sterilizing process of films produced by spraying the lacquer of Example A in spite of its containing 30% vinyl resin, and relying only on the very short cure obtained by spraying it on a hot, freshly soldered seam. The fact that a film resulting from the lacquer of Example B also has excellent adhesion, water resistance and solvent resistance, contrary to what would normally be expected from a film composed of 60% vinyl resin copolymer, even with a bake of ten minutes at 300° F., is also so surprising as to indicate that the vinyl resin copolymer acts in the lacquer more than merely as an inert diluent, but enters, at least partially, into the epoxy-amide reaction. However, the reaction, if there is one, is not completely understood, but is not believed to be essential to an understanding of the invention. Suffice it to recognize that the three ingredients, when suitably mixed and applied in conventional manner as thin coatings, will quickly cure at low temperatures into tough, flexible continuous films, which will strongly adhere to bare tinplate and have remarkable resistance to chemical and solvent attack, and which characteristics are beyond that to be expected from mixtures of epoxy resin and fatty acid polyamides, not including the vinyl resin copolymer or from coatings of any one of the three ingredients separately.

The vinyl resin copolymer of choice consists essentially of vinyl chloride to which has been added relatively smaller amounts of vinyl acetate and vinyl alcohol. Thus the vinyl resin Bakelite VAGH used in the aforesaid examples to illustrate the invention and which is a commercially available product of The Bakelite Company, a division of Union Carbide and Carbon Corporation, is understood to comprise by weight 89.1 to 91.5% vinyl chloride, 2.0 to 5.5% vinyl acetate and 5.3 to 7.0% vinyl alcohol.

Although there are a number of commercially available fatty acid polyamides, only the most highly reactive fluid types have been found useful. Thus the Versamids 100, 115 and 125 distributed by General Mills, Inc., Kankakee, Illinois, are to be preferred over the more solid members of the group, which have too little reactivity to obtain any appreciable cure. These amides are amine terminated condensation products of soy fatty acids, such as linoleic acid, and diethylene triamine according to the reaction:

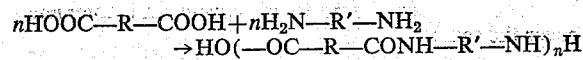

$$n\text{HOOC}—\text{R}—\text{COOH} + n\text{H}_2\text{N}—\text{R}'—\text{NH}_2$$
$$\rightarrow \text{HO}(—\text{OC}—\text{R}—\text{CONH}—\text{R}'—\text{NH})_n\text{H}$$

as more fully described in U.S. Patent No. 2,379,413, owned by General Mills, Inc., R and R' being alkylene chains and $n$ an integer which varies in the different grades of Versamid. Versamid 100 which is described as a soft, tacky resin that is semi-solid at room temperatures is the linoleic acid polyamide of choice for seam lacquering purposes, although for some uses Versamid 115 which is a viscous liquid resin and Versamid 125 which is fluid at room temperature may be preferred. Said polyamides are described by their manufacturer as having the following specifications:

| Versamid | 100 | 115 | 125 |
|---|---|---|---|
| Amine Value | 83–93 | 210–230 | 290–320 |
| Color—Gardner (Solid Resin) | NDT 12 | NDT 12 | NDT 12 |
| Melting Point (ASTM 1240) | 43–53 | Fluid | Fluid |
| Viscosity—Poises—40° C.: #6 spindle, 4 r.p.m. | | 500–750 | 80–120 |
| Viscosity—Poises, 150°: #2 spindle, 20 r.p.m. | 10–15 | | |
| Percent Ash (by weight) | 0.05 | 0.05 | 0.05 |
| Specific Gravity | 0.98 | 0.99 | 0.97 |
| Pounds per gallon | 8.2 | 8.3 | 8.1 |
| Penetration, 25° C.—ASTM D-5-52 | 100 | | |

These fatty acid polyamides are characterized in that they have reactive groups spaced along their molecules as polar amine, carboxyl and amide groups and when mixed with the epoxy resin and vinyl resin copolymer combine with the epoxide and hydroxyl groups of the epoxy resin and, presumably, reactive groups of the vinyl resin copolymer to produce cross linked three dimensional products, having carbon-nitrogen-carbon bonds which are more resistant to chemical attack than the ester linkages found in conventional coatings. Thus a three dimensional polymer may be obtained without heating having excellent adhesion toughness and chemical resistance. Other resins having reactive amine groups, such as normal urea-formaldehyde and melamine formaldehyde resin, can be mixed with epoxy resin to get a cured film, but require a high temperature for reaction. Amines, such as diethylene triamine can be used to cure epoxy resin at room temperature, but pot life is extremely short and they are toxic.

Epoxy resins are complex polymeric reaction products of polyhydric phenols with polyfunctional halohydrins such as epichlorhydrin and glycerol dichlorhydrin. Usually the difunctional chlorohydrin is used in proportions in excess of that equivalent to the polyhydric phenol and less than that which is twice the equivalent amount. The reaction is carried out in the presence of caustic alkali which is usually employed in at least the quantity necessary to combine with the halogin liberated from the halohydrin, and usually is employed in excess. The products obtained may contain terminal epoxy groups or terminal epoxy groups and terminal primary hydroxide groups. A typical molecule would have the following formula:

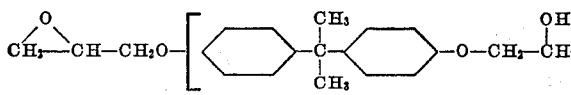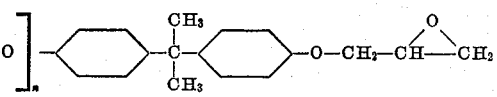

In the complex reaction mixture the terminal epoxy groups are generally in excess of the terminal primary hydroxyl groups. Typical polyhydric phenols include resorcinol and various bisphenols resulting from the condensation of phenol with aldehydes and ketones such as formaldehyde, acetaldehyde, acetone, methyl ethyl ketone and the like. The molecular weight of the epoxy resins may be controlled by the relative proportions of the reactants as well as by the extent to which the reaction is carried.

In the present invention, only those epoxy resins which are of sufficiently low molecular weight as to be compatible with the vinyl resin copolymer are utilized. Preferred examples are the mentioned Araldite 6040, a product of the Ciba Corporation, and Epon 864, a product of the Shell Chemical Corporation. The latter is described by its manufacturer as a viscous material, readily pourable when heated only slightly above room temperature (M.P. 40–45° C.), having a viscosity (Gardner-Holdt) $A_1$–B, an epoxide value eq./100 g. of 300–375 and an ester value of eq./100 g. of 115. Although lower molecular weight, and thus more fluid, epoxy resins may be used, those resins of the so-called "hard grade" by reason of their higher molecular weight are not compatible. Thus Epon 1001 having a M.P. of 64–76° C., a viscosity (Gardner-Holdt) rating of C–G, an epoxide value eq./100 g. of 450–525 and an ester value eq./100 g. of 145 and Epon 1004 having even higher melting points, viscosity, epoxide and ester values do not give as satisfactory a product. Similarly, whereas Araldite 6040 is compatible, Araldite 6070 and 6075 are not.

Although the ratio of proportions recited in Example A above is to be preferred, considerable latitude in proportions may be exercised with beneficial results. The epoxy resin-polyamide ratio is preferably kept at equal parts by weight where Versamid 100 is the polyamide of choice. For Versamid 115, the optimum ratio with epoxy resin is 1 of polyamide to 2 of epoxy; and, where Versamid 125 is used, it is 1 of polyamide to 3 of epoxy. Where a more reactive epoxy resin is used than the Araldite 6040 or Epon 864, a higher percentage of polyamide may be required to obtain maximum reaction. The amount of vinyl resin copolymer can be varied considerably within the rather wide limits of 5 to 95% by weight, although more desirable coatings are obtained within the narrower range of 10 to 80%.

Since the polyamides will react with epoxy resin, at a significant rate, at temperatures as low as 50° F., it is desirable that the two resins be kept separate until just before use. For this reason, preferably the polyamide is mixed in half the quantity of vinyl resin copolymer and the epoxy resin in the other half of the vinyl resin copolymer and the two kept separate until ready for use. However, where the concentration in the composition of vinyl resin copolymer is 60% or more, as in the instance of Example B, the mixture has sufficiently adequate stability that it may be packaged and stored in a single container. In this connection, Versamid 115 and 125 lead to a shorter package stability than Versamid 100 but faster cures. Preferably, also the compositions are best prepared at low viscosities approximately ready for use without further dilution, such as 15 to 50 sec. Ford #4 cup at 77° F., since the higher the viscosity, the shorter the package stability.

Although the compositions have thus far been described as side seam lacquers or lacquers useful for lining the interior surfaces of cans, the coatings will conceivably have application in other fields. Thus, they are useful as paper coatings, general maintenance coatings, adhesives and roller coatings, and in general, wherever it is important to have a tough, flexible water, steam and chemical resistant protective film. In such applications, an advantage of coatings according to the invention is not only the strong adherence and protection afforded by films of the aforesaid compositions, but also the ability to provide said advantages of protection and adherence by means of a coating and which is adapted for application in conventional manner as by spraying, dipping, roller coating and can be cured into its adherent thermosetting stage at a much lower and shorter bake than required with coatings of other compositions previously used for this purpose.

All of the objects and advantages as well as features of the invention have therefore been demonstrated above as obtainable in convenient, economical and practical manner. Furthermore, it will be understood that many changes or modifications of the steps in the described process or ingredients of the disclosed compositions and coatings may be made and are intended to be included within the spirit of the invention as defined in the appended claims.

Having described my invention, I claim:

1. A container of tin plate having its interior surface lined with a thin, tough, flexible, continuous, protective baked-on coating of thermosetting resin directly adhering to the bare tin plate and consisting essentially of the product which results from heating an organic solvent solution deposited directly on said bare metal and containing low molecular weight epoxy resin, reactive fatty acid polyamide and hydroxyl-containing vinyl chloride-vinyl acetate copolymer wherein the epoxy resin and polyamide are present in a ratio between 1:1 and 3:1 and the copolymer comprises at least 30% by weight of the total resin content, said coating being highly resistant to solvents including water and steam, and of low flavor and odor transmission.

2. A container formed of metal and with a soldered seam, at least said soldered seam having a thin, protective water and chemical resistant coating comprised of an in situ heat-cured thermosetting product of low molecular weight epoxy resin, reactive fatty acid polyamide and at least 30% by weight of hydroxyl-containing copolymer of vinyl chloride and vinyl acetate resulting from the heating of an organic solvent solution thereof directly deposited onto the bare soldered seam, said coating constituting a tought yet flexible, tackfree, continuous film of the heat-cured thermosetting product strongly adhering directly to and completely covering the soldered seam, said coating further being of low flavor and odor transmission, and having high resistance to breakdown when subjected to treatment with steam.

3. A method of covering the soldered seam of cans comprising the steps of applying to the seam while still hot from the soldering operation an uncured coating of organic solvent containing hydroxyl-containing vinyl chloride-vinyl acetate copolymer mixed with a compatible low molecular weight epoxy resin and reactive fatty acid polyamide in such related proportions that the coating will gel on contact with the freshly soldered seam to a tack-free continuous film and, under the action of the heat remaining in the seam, quickly cure to form a tough, flexible, continuous film of thermosetting resin strongly adhering directly to the soldered seam and completely covering the same, said film being essentially free of breaks and pinholes through which moisture may gain entrance to destroy adherence of the film.

4. A method of lining metal cans which comprises the steps of applying to a surface thereof a thin coating of organic solvent containing a copolymer of essentially vinyl chloride and minor amounts of vinyl acetate and vinyl alcohol, said copolymer being mixed with low molecular weight epoxy resin compatible with said copolymer and reactive fatty acid polyamide in an approximate ratio of 1 to 3 parts by weight of epoxy resin for each part of polyamide, the copolymer comprising at least 30% by weight of the resin content of said coating, and causing the same under the action of heat to set to a tack-free, continuous resin layer and quickly cure into a thin, tough, flexible continuous thermosetting protective film that strongly adheres directly to the bare metal and is resistant to water and breakdown by steam when said cans are sterilized therewith.

5. A low temperature curing coating composition of long pot-life and useful as a side seam lacquer for covering the soldered seams and lining the interior of cans comprised essentially of organic solvent containing from 20 to 35% by weight of a resin mixture capable, when applied as a thin coating to bare metal and heated, of curing into a thin, tough, flexible, continuous, thermosetting film strongly adhering directly to the bare metal, said resin mixture comprising at least 30% by weight of hydroxyl-containing copolymer of vinyl chloride and vinyl acetate, and the balance reactive fatty acid polyamide and low molecular weight epoxy resin compatible with said copolymer in an approximate ratio of 1 to 3 parts of epoxy resin per part of polyamide.

6. A coating composition according to claim 5 wherein the copolymer comprises by weight about 89.5 to 91.5% vinyl chloride, 2.0 to 5.5% vinyl acetate and 5.3 to 7.0% vinyl alcohol, the fatty acid polyamide comprises the condensation product of linoleic acid and diethylene triamine, and the epoxy resin comprises the condensation product of epichlor hydrin and bisphenol.

7. A low temperature curing coating composition useful as a side seam lacquer for covering the soldered seams and lining the interior of cans comprised essentially of equal parts by weight of (1) a vinyl chloride copolymerized with minor proportions of vinyl acetate and vinyl alcohol, (2) low molecular weight epoxy resin and (3) reactive fatty acid polyamide, said ingredients being dissolved in suitable organic solvent.

8. A low temperature curing coating composition having a long pot-life and usefulness as a side seam lacquer for covering the soldered seams and lining the interior of cans comprised essentially of (1) three parts by weight of a copolymer essentially of vinyl chloride and minor proportions of vinyl acetate and vinyl alcohol (2) one part of epoxy resin compatible with said copolymer, (3) two parts of reactive fatty acid polyamide and (4) the balance comprising organic solvent; a thin coating of which will quickly gel on the application of heat into a tack-free continuous film and thereafter cure into a tough, flexible, continuous, thermosetting film which strongly adheres directly to bare metal to which it has been applied and will resist breakdown in the presence of steam at sterilizing temperatures.

References Cited in the file of this patent

UNITED STATES PATENTS

| | | |
|---|---|---|
| 2,699,413 | Seagren et al. | Jan. 11, 1955 |
| 2,769,826 | Yoho | Nov. 6, 1956 |

OTHER REFERENCES

"Industrial and Chemical Engineering," pp. 2226–2232, October 1954.